United States Patent
Kim et al.

(10) Patent No.: US 8,138,741 B2
(45) Date of Patent: Mar. 20, 2012

(54) HIGH VOLTAGE GENERATOR IN SEMICONDUCTOR MEMORY

(75) Inventors: Jin-kook Kim, Gunpo-si (KR); Joon Young Kwak, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 703 days.

(21) Appl. No.: 12/232,242

(22) Filed: Sep. 12, 2008

(65) Prior Publication Data
US 2009/0072799 A1    Mar. 19, 2009

(30) Foreign Application Priority Data
Sep. 13, 2007 (KR) .................. 10-2007-0093260

(51) Int. Cl.
*G05F 1/12* (2006.01)
(52) U.S. Cl. .................. 323/297; 323/268; 323/280
(58) Field of Classification Search .................. 323/268, 323/280, 297
See application file for complete search history.

(56) References Cited

U.S. PATENT DOCUMENTS
7,002,869 B2 * 2/2006 Zhang et al. .................. 365/226
7,804,722 B2 * 9/2010 Jang .................. 365/189.09

FOREIGN PATENT DOCUMENTS
| JP | 2001-006378 | 1/2001 |
| KR | 10-0146076 | 5/1998 |
| KR | 10-2004-0079119 | 9/2004 |
| KR | 10-2006-0038816 | 5/2006 |

* cited by examiner

Primary Examiner — Jessica Han
Assistant Examiner — Lakaisha Jackson
(74) Attorney, Agent, or Firm — Harness, Dickey & Pierce, P.L.C.

(57) ABSTRACT

A voltage generator is provided. The voltage generator includes a voltage pump and a voltage controller. The voltage pump generates a target voltage using a clock signal. The voltage controller compares a temporary voltage input from the voltage pump with a reference voltage to generate a control signal controlling the voltage pump. The voltage controller includes a string of a plurality of resistors connected in series to change a level of the temporary voltage to a voltage level of a corresponding comparison voltage. When the plurality of resistors are in a string, a resistance of a resistor closest to one end of the string is greater than resistances of other resistors of the string. The voltage controller may further include a jumping unit controlling connection or disconnection of two arbitrary nodes among first to n-th nodes (where n is a natural number) defined as connection points of the adjacent resistors of the string. Accordingly, the voltage generator can generate a voltage of with a more accurate level.

5 Claims, 11 Drawing Sheets

HIGH VOLTAGE GENERATOR IN SEMICONDUCTOR MEMORY

PRIORITY STATEMENT

This application claims the benefit of Korean Patent Application No. 10-2007-0093260, filed on Sep. 13, 2007, in the Korean Intellectual Property Office, the disclosure of which is incorporated herein in its entirety by reference.

BACKGROUND

1. Field

Example embodiments relate to a semiconductor device, and more particularly, to a voltage generator that can generate a more accurate target voltage level in a semiconductor memory.

2. Description of the Related Art

Flash memories are nonvolatile storage devices that can electrically erase or rewrite data. Flash memories consume less power than storage devices based on magnetic disk memories, and have a fast access time comparable to hard disks.

Flash memories are classified into NOR flash memories and NAND flash memories according to a connection structure of cells and bit lines. In NOR flash memories, two or more cell transistors are connected in parallel to one bit line. NOR flash memories store data using channel hot electron injection, and erase data using Fowler-Nordheim (F-N) tunneling. In NAND flash memories, two or more cell transistors are connected in series to one bit line. NAND flash memories store and erase data using F-N tunneling. Generally, NOR flash memories are disadvantageous to high density of integration because of their high current consumption, but advantageous to high speed operation. NAND flash memories are advantageous to high density of integration because their lower cell current relative to NOR flash memories.

Figure 1:
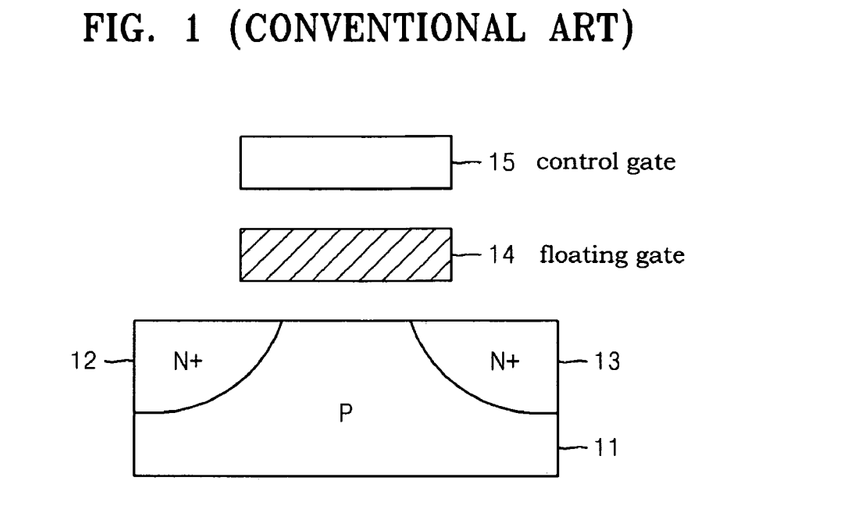
FIG. 1 is a cross-sectional view of a unit cell of a flash memory.

FIG. 1 is a cross-sectional view of a unit cell of a flash memory.

Referring to FIG. 1, a flash memory stores data in an array of floating gate transistors, called cells. The flash memory includes a p-type semiconductor substrate 11 doped with boron ions or the like. An n-type source region 12 and an n-type drain region 13 may be formed in the substrate 11 by doping phosphorus, arsenic, or antimony into the substrate 11. A floating gate 14 may be formed over the substrate 11 or may be isolated from the substrate 11. A control gate 15 may be formed over the floating gate 14 or may be isolated from the floating gate 14. Since the floating gate 14 is completely isolated from others, charges stored in the floating gate 14 are trapped and data can be retained in the floating gate 14 without power consumption.

Figure 2A:
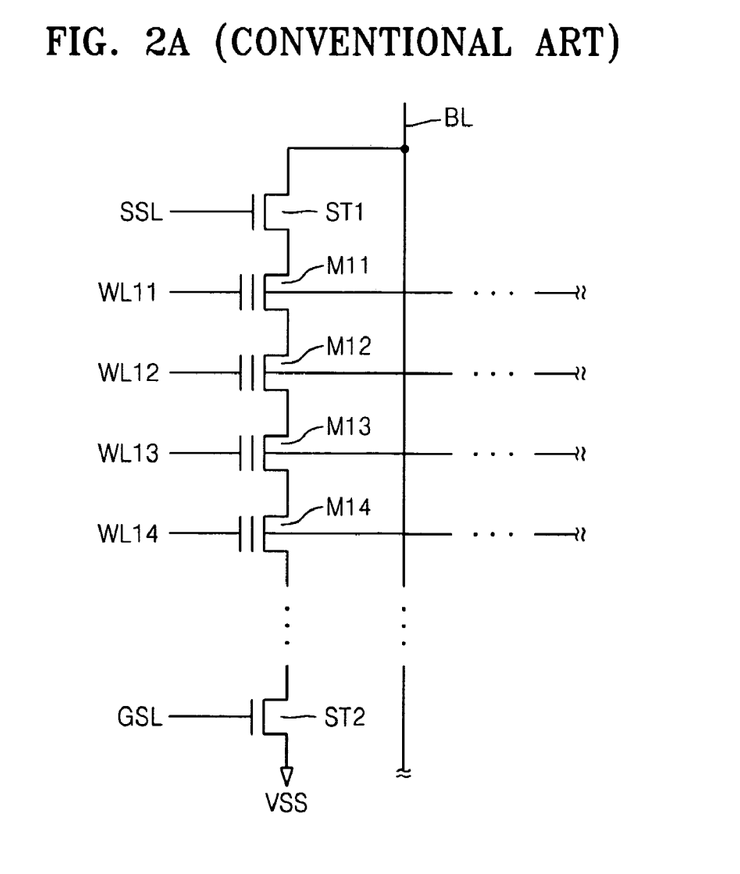
FIG. 2A is a circuit diagram of a memory cell structure in a conventional NAND flash memory.

FIG. 2A is a circuit diagram of a memory cell structure in a conventional NAND flash memory.

Referring to FIG. 2A, the conventional NAND flash memory includes a plurality of word lines WL11 through WL14 and a plurality of memory cells M11 through M14. The memory cells M11 through M14 and select transistors ST1 and ST2 are arranged in a string structure and are connected in series between a bit line BL and a ground voltage terminal VSS. Since the NAND flash memory uses a small cell current, all memory cells connected to one word line are programmed by a one-time program operation.

Figure 2B:
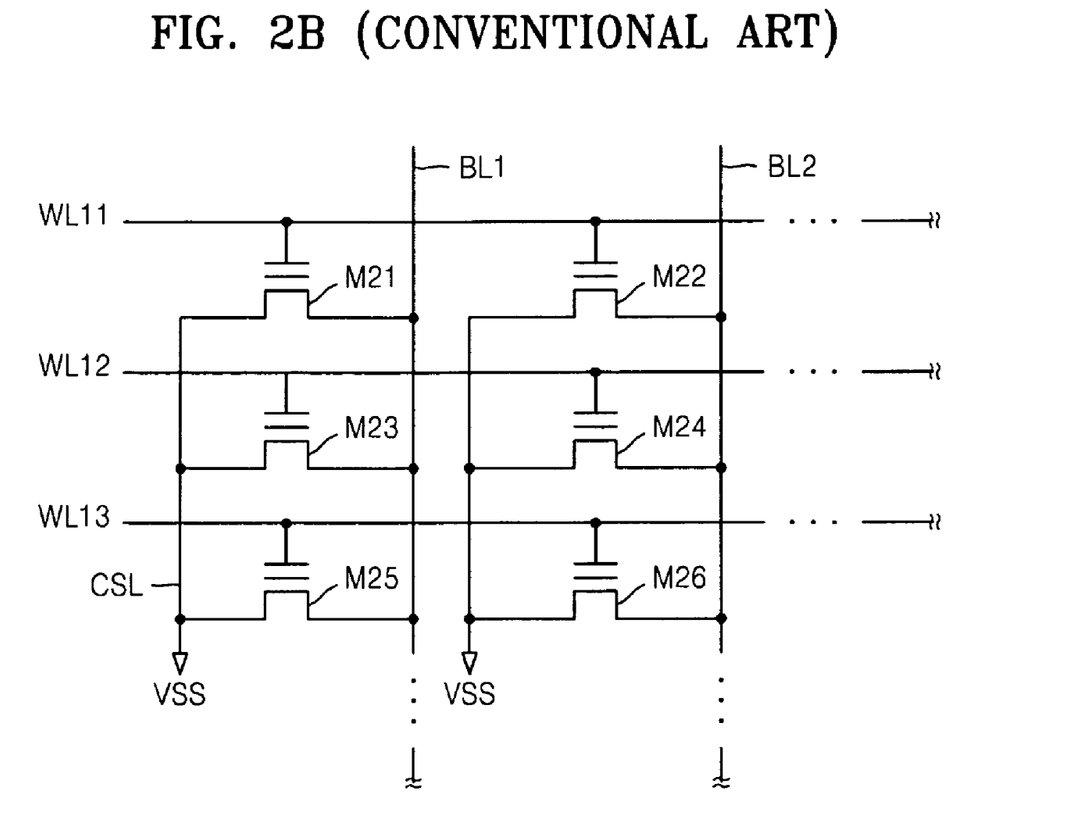
FIG. 2B is a circuit diagram of a memory cell structure in a conventional NOR flash memory.

FIG. 2B is a circuit diagram of a memory cell structure in a conventional NOR flash memory.

Referring to FIG. 2B, the conventional NOR flash memory includes a plurality of memory cells M21 through M26 connected between bit lines BL1 and BL2 and a source select line CSL. Since the NOR flash memory uses a large cell current, a predetermined number of memory cells are programmed by a one-time program operation.

Figure 3A:
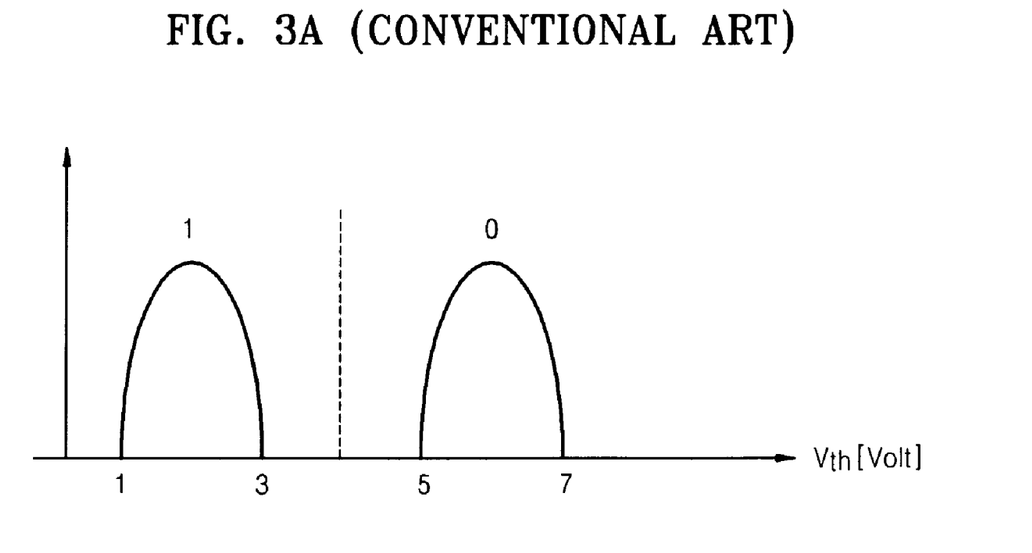
FIGS. 3A and 3C are graphs, respectively, illustrating cell threshold voltages of data stored in an SLC NOR flash memory and an SLC NAND flash memory.
Figure 3B:
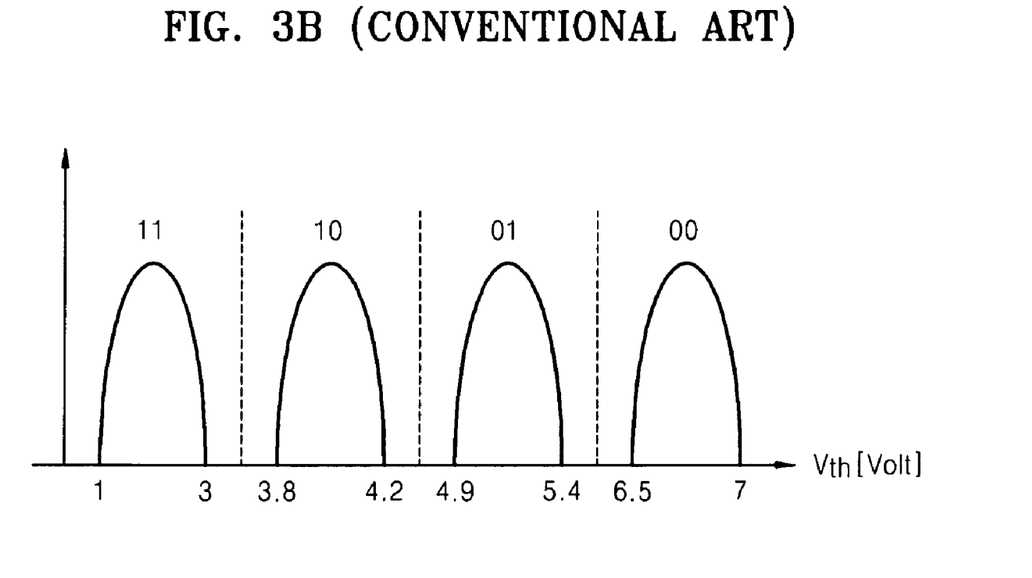
FIGS. 3B and 3D are graphs, respectively, illustrating cell threshold voltages of data stored in an MLC NOR flash memory and an MLC NAND flash memory.
Figure 3C:
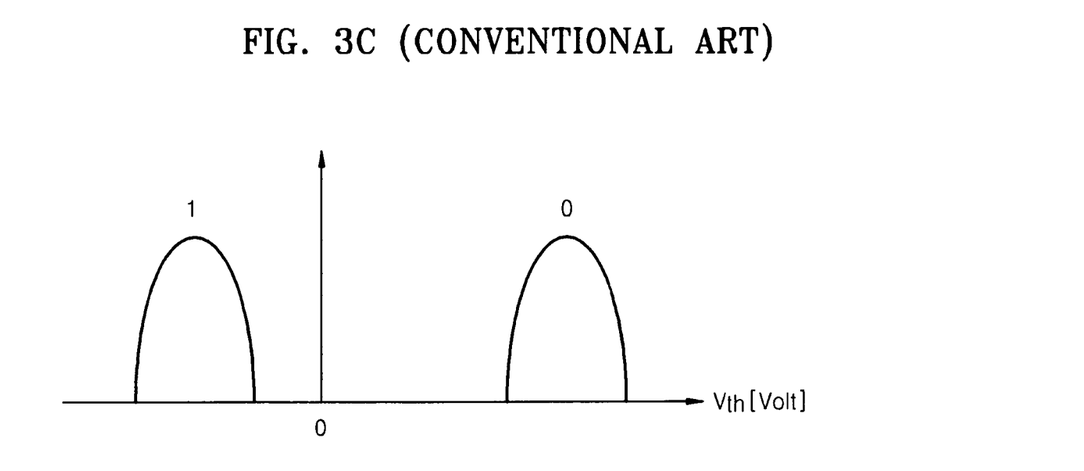
Figure 3D:
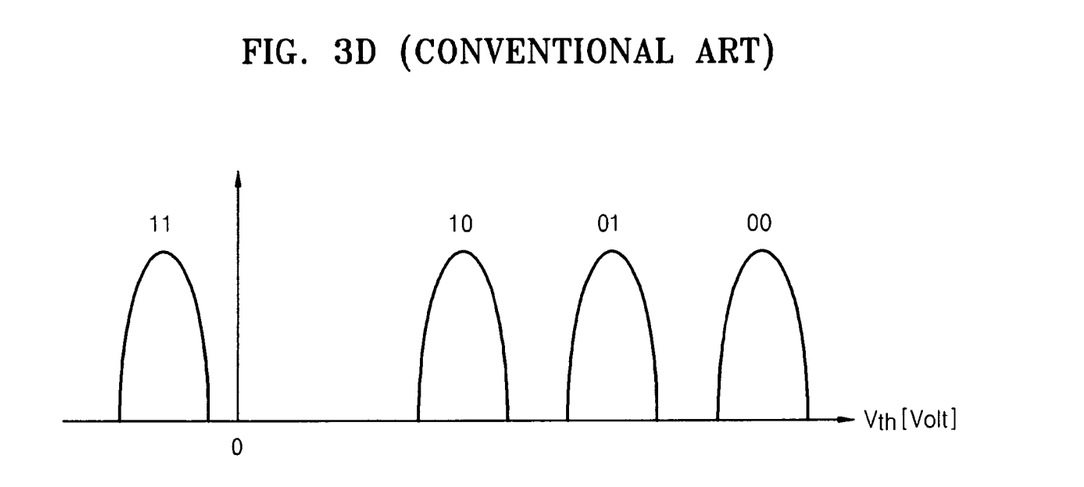

FIGS. 3A and 3C are graphs, respectively, illustrating cell threshold voltages of stored data when the memory cells of the flash memory are single-level cells (SLCs), and FIGS. 3B and 3D are graphs, respectively, illustrating cell threshold voltages of stored data when the memory cells of the flash memory are multi-level cells (MLCs).

Referring to FIGS. 3A and 3C, the SLC stores 1-bit data with two different threshold voltages programmed in the memory cell. For example, in the case of FIG. 3A, data stored in the memory cell is logic "1" when the threshold voltage programmed in the memory cell is in the range between 1 V and 3 V, and data stored in the memory cell is logic "0" when the threshold voltage programmed in the memory cell is in the range between 5 V and 7 V. A voltage distribution of an SLC NOR flash memory is illustrated in FIG. 3A, and a voltage distribution of an SLC NAND flash memory is illustrated in FIG. 3C.

Referring to FIGS. 3B and 3D, the MLC stores 2-bit data with four different threshold voltages programmed in the memory cell. For example, in the case of FIG. 3B, data stored in the memory cell is logic "11" when the threshold voltage programmed in the memory cell is in the range between 1 V and 3 V, and data stored in the memory cell is logic "10" when the threshold voltage programmed in the memory cell is in the range between 3.8 V and 4.2 V. Data stored in the memory cell is logic "01" when the threshold voltage programmed in the memory cell is in the range between 4.9 V and 5.4 V, and data stored in the memory cell is logic "01" when the threshold voltage programmed in the memory cell is in the range between 6.5 V and 7.0 V. A voltage distribution of an MLC NOR flash memory is illustrated in FIG. 3B, and a voltage distribution of an MLC NAND flash memory is illustrated in FIG. 3D.

In the SLC or MLC flash memories, data stored in the memory cell are distinguished by a cell current difference in a read operation. Since the operations and types of the flash memories described above are well known to those of ordinary skill in the art, detailed description thereof will be omitted.

As described above, the flash memories use various high voltage levels. To this end, the conventional flash memories use a high voltage generator to generate high voltages of various levels. However, since a voltage margin between data in MLC flash memories is reduced, it is important to generate an accurate high voltage level.

Furthermore, when a program operation is performed using an Increment Step Plus Program (ISPP) scheme of the MLC flash memory, step voltages with a smaller margin are required and thus parasitic resistances generated within the high voltage generator may effect an accuracy of the voltage generator.

SUMMARY

Example embodiments provide a voltage generator, for example, a high voltage generator, that can generate a voltage with a more accurate level in a flash memory.

Example embodiments also provide a flash memory including a voltage generator that can generate a voltage with a more accurate level.

Example embodiments also provide a memory system including a voltage generator that can generate a voltage with a more accurate level.

According to example embodiments, there is provided a voltage generator including a voltage pump and a voltage controller. The voltage pump may generate a target voltage using a clock signal. The voltage controller may compare a temporary voltage input from the voltage pump with a reference voltage to generate a control signal controlling the voltage pump.

The voltage controller may include a string of a plurality of resistors connected in series to change a level of the temporary voltage to a voltage level of a corresponding comparison voltage. When the plurality of resistors are in a string, a resistance of a resistor closest to one end of the string may be greater than resistances of the remaining resistors of the string.

The voltage controller may include an information providing unit and a voltage comparing unit. The information providing unit may provide voltage information about the target voltage. The voltage comparing unit may compare the reference voltage with the comparison voltage.

The voltage comparing unit may include a plurality of transistors and a comparator. The plurality of transistors may be connected in parallel to the corresponding resistors of the string and be turned on or off in response to bits of the voltage information. The comparator may be connected to the other end of the string and compares the comparison voltage with the reference voltage to generate the control signal. The comparator may include a differential amplifier receiving the reference voltage at a non-inverting terminal and the comparison voltage at an inverting terminal to output the control signal.

Resistances of the resistors may gradually decrease from the one end of the string connected to the voltage pump to the other end of the string connected to the comparator. A difference of resistance between the adjacent resistors may be two times or ½ times.

The voltage controller may further include a switching unit receiving the bits of the voltage information and an input voltage to generate logic signals controlling turning on/off operations of the transistors.

The control signal may have a first logic level when the reference voltage is equal to the comparison voltage. When the control signal of the first logic level is input, the voltage pump finishes a voltage pumping operation and outputs the temporary voltage as the target voltage.

The voltage controller may include a jumping unit controlling connection or disconnection of two arbitrary nodes among first to n-th nodes (where n is a natural number) defined as connection points of the adjacent resistors of the string.

The jumping unit may include a short transistor and a control logic. The short transistor may be connected between the two arbitrary nodes. The control logic may generate a switching signal turning on or off the connection transistor according to the bit values of the voltage information. The jumping unit may further include a switch turning on or off the connection transistor in response to the switching signal.

One or more jumping units may be provided. The jumping unit(s) may be disposed between two arbitrary nodes where same number of resistors are connected. The jumping unit(s) may be disposed between two arbitrary nodes where a different number of resistors are connected.

The nonvolatile memory may be a flash memory.

According to example embodiments, there is provided a voltage generator including a voltage pump and a voltage controller. The voltage pump may generate a target voltage using a clock signal. The voltage controller may compare a temporary voltage input from the voltage pump with a reference voltage to generate a control signal controlling the voltage pump. The voltage controller may include: a string of a plurality of resistors connected in series to change a voltage level of the temporary voltage to a voltage level of a corresponding comparison voltage; and a jumping unit controlling connection or disconnection of two arbitrary nodes among first to n-th nodes (where n is a natural number) defined as connection points of the adjacent resistors of the string.

According to example embodiments, there is provided a memory including a voltage generator.

According to example embodiments, there is provided a memory system including a memory and a memory controller controlling the memory.

BRIEF DESCRIPTION OF THE DRAWINGS

The above and other features and advantages of example embodiments will become more apparent by describing them in detail thereof with reference to the attached drawings in which.

DETAILED DESCRIPTION

The attached drawings for illustrating example embodiments are referred to in order to gain a sufficient understanding of the present invention, the merits thereof, and the objectives accomplished by the implementation of the present invention.

Hereinafter, example embodiments will be described in detail by explaining preferred embodiments of the invention with reference to the attached drawings. Like reference numerals in the drawings denote like elements.

Figure 4:
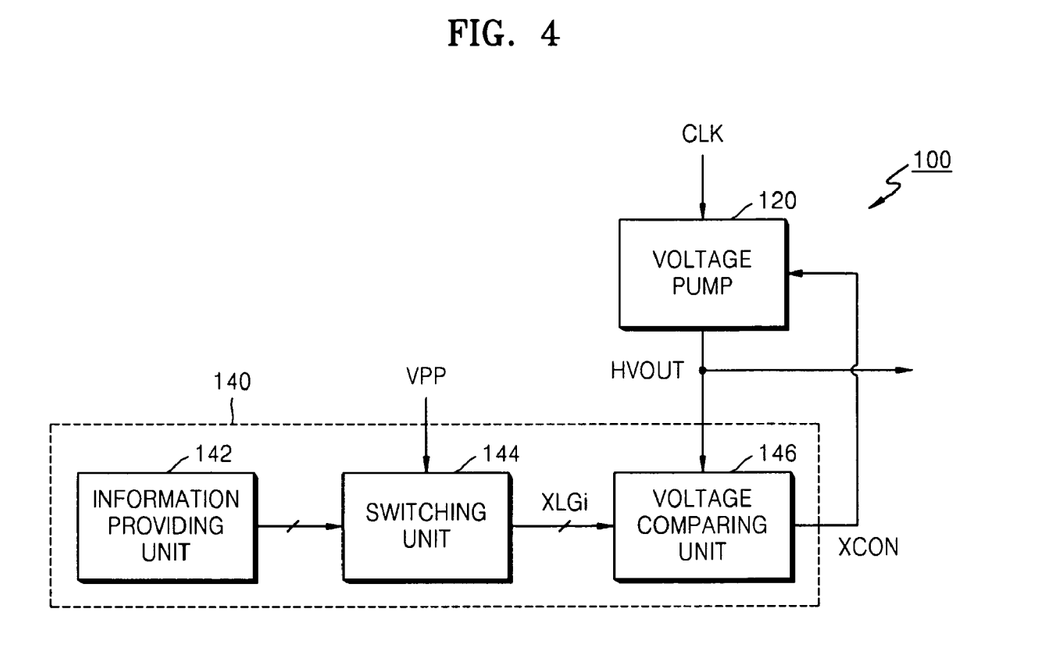
FIG. 4 is a block diagram of a voltage generator according to example embodiments.

FIG. 4 is a block diagram of a voltage generator according to example embodiments.

Referring to FIG. 4, the voltage generator 100 according to example embodiments may include a voltage pump 120 and/or a voltage controller 140. The voltage generator 100 may be provided in a nonvolatile memory, for example, a flash memory. The voltage pump 120 generates a voltage using a clock signal CLK. The voltage controller 140 may include an information providing unit 142, a voltage comparing unit 146, and/or a switching unit 144.

The voltage controller 140 provides the voltage pump 120 with a control signal XCON controlling whether the voltage pump 120 outputs a voltage of a currently generated level, or continuously performs a voltage pumping operation. That is, the voltage controller 140 checks whether the voltage pump 120 generates a voltage Vout of a desired level. The voltage Vout of the desired level will be referred to as a target voltage.

When the output voltage of the voltage pump 120 reaches the target voltage Vout, the voltage controller 140 provides the voltage pump 120 with a control signal XCON of a first logic level. The first logic level may be logic low "L". The voltage pump 120 outputs a voltage Vout of a current level. On the other hand, when the output voltage of the voltage pump 120 has not reached the target voltage Vout, the voltage controller 140 provides the voltage pump 120 with a control signal XCON of a level different from the first logic level, and the voltage pump 120 continuously performs a pumping operation until the control signal XCON of the first logic level is input thereto.

An operation of checking the voltage level of a temporary voltage Vout' and generating the control signal XCON at the voltage controller 140 will now be described.

Figure 5:
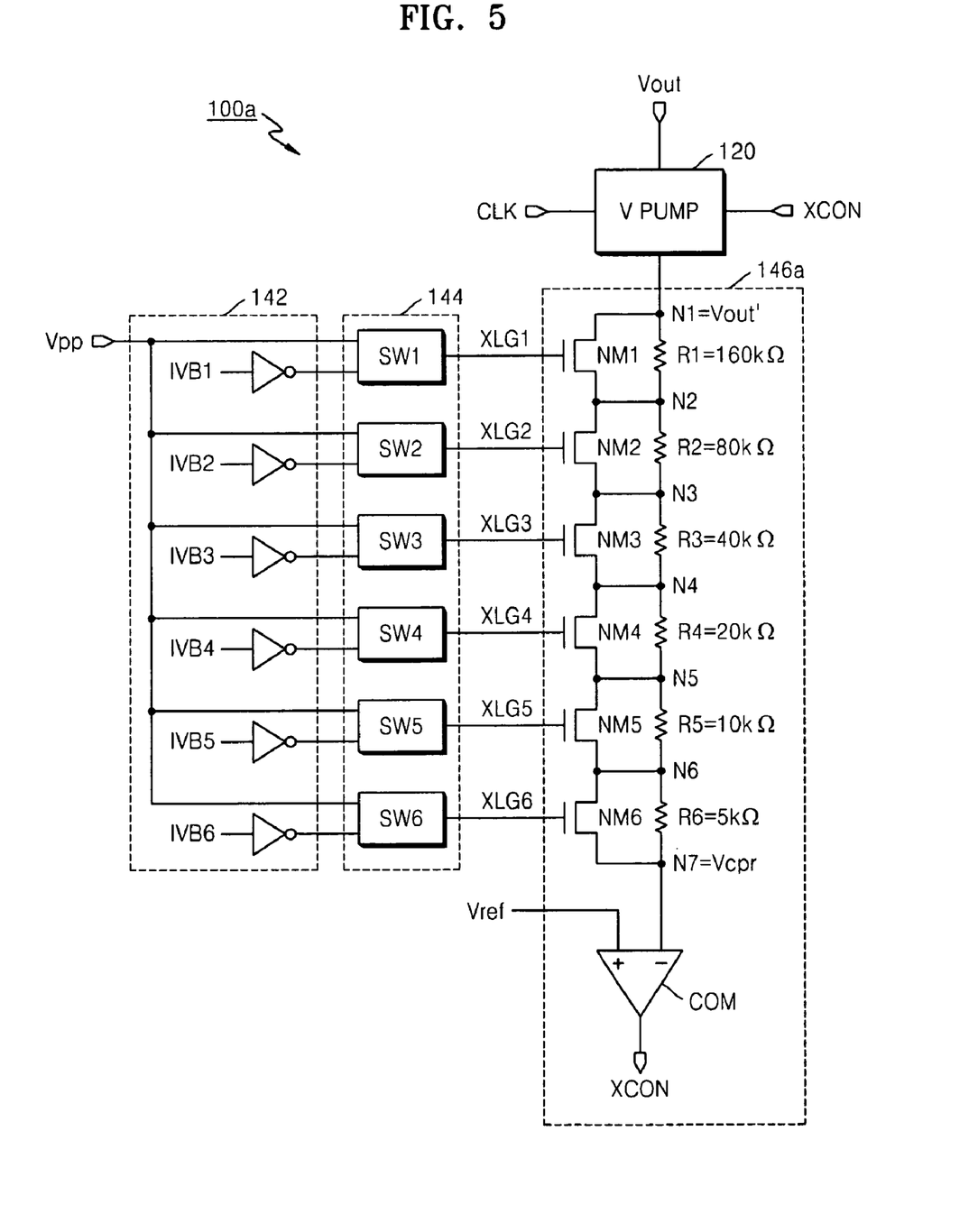
FIG. 5 is a circuit diagram of the voltage generator of FIG. 4 according to example embodiments.

FIG. 5 is an example circuit diagram of the voltage generator of FIG. 4 according to example embodiments.

Referring to FIGS. 4 and 5, the voltage controller 140 compares a reference voltage Vref with a comparison voltage Vcpr, and checks whether a voltage level of a temporary voltage Vout' reaches the target voltage Vout. The comparison voltage Vcpr is generated corresponding to the temporary voltage Vout'. The information providing unit 142 provides voltage information IVBi on the target voltage Vout the voltage generator 100 intends to generate. The voltage information IVBi is transferred to the switching unit 144 bit by bit. In example embodiments of FIG. 5, the respective bit values of n-bit (where n is an integer>0, in this example, n=6) voltage information IVBi are inverted and transferred to the corresponding switches SW1 through SW6 of the switching unit 144.

The switches SW1 through SW6 of the switching unit 144 generate signals XLGi, based on the respective bits of the voltage information IVBi and the input voltage Vpp. For example, the first bit value IVB1 of the voltage information IVBi is inverted and input to the first switch SW1 of the switching unit 144. The second bit value IVB2 of the voltage information IVBi is inverted and input to the second switch SW2 of the switching unit 144. In the same manner, the bit values of the voltage information IVBi are inverted and input to the corresponding switches of the switching unit 144. In this manner, the input voltage Vpp is input to the respective switches SW1 through SW6.

The switches SW1 through SW6 generate one of the signals XLGi having the voltage Vpp or a ground voltage to control turning on and off transistors NM1 through NM6 according to the input bit values. The generated signals XLGi are transferred to the voltage comparing unit 146.

The voltage comparing unit 146 compares the reference voltage Vref with the temporary voltage Vout inputted from the voltage pump 120, and generates the control signal XCON controlling the voltage pump 120. To this end, the voltage comparing unit 146 may include a plurality of transistors NM1 through NM6 in a string and a comparator COM.

One end (a first node N1) of the string is connected to the voltage pump 120 to receive the voltage Vout. In addition, the other end (a seventh node N7) of the string is connected to the comparator COM. At this point, a node voltage of the seventh node N7 may be equal to the comparison voltage Vcpr.

The string may include a plurality of resistors connected in series between the one end connected to the voltage pump 120 and the other end connected to the comparator COM. The number of the resistors is equal to the bit number of the voltage information IVBi. In FIG. 5, the string includes first through sixth resistors R1 through R6 disposed between the first node N1 and the seventh node N7.

In the resistors R1 through R6 of the string illustrated in FIG. 5, the resistance of the resistor closest to the first node N1 of the string is larger than that of any other resistor. In addition, resistances may gradually decrease from the node N1 connected to the voltage pump 120 to the seventh node N7 connected to the comparator COM. A difference of resistance between the adjacent resistors may be two times or ½ times. In FIG. 5, the first resistor R1 is 160 KΩ and the second resistor R2 is 80 kΩ. The third resistors R3, R4, R5 and R6 are 40 kΩ, 20 kΩ, 10 kΩ, and 5 kΩ, respectively. That is, the resistances decrease by factor of two from the first node N1 to the seventh node N7 of the string.

The transistors NM1 through NM6 are connected in parallel to the corresponding resistors of the string. The transistors NM1 through NM6 may be NMOS transistors. The signals XLGi generated from the switching unit 144 are transferred to the corresponding NMOS transistors NM1 through NM6. The transistors NM1 through NM6 are turned on or off in response to the corresponding signals XLGi.

The resistance of the string changes according to the turning on/off operation of transistors NM1 through NM6. For example, assuming that the 6-bit voltage information on the target voltage Vout is "100011", the first switch SW1 transfers the ground voltage level of XLG1 to the first NMOS transistor NM1 because the first bit IVB1 of the voltage information is "1". Thus, the first NMOS transistor NM1 is turned off. Since the second bit IVB2 of the voltage information is "0", the second switch SW2 transfers the Vpp level of XLG2 to the second NMOS transistor NM2. Thus, the second NMOS transistor NM2 is turned on.

In addition, since the third bit IVB3 and the fourth bit IVB4 of the voltage information are "0", the third NMOS transistor NM3 and the fourth NMOS transistor NM4 are turned on. Since the fifth bit IVB5 and the sixth bit IVB6 of the voltage information are "1", the fifth NMOS transistor NM5 and the sixth NMOS transistor NM6 are turned off.

A current (not shown) flows through the first resistor R1, the second NMOS transistor NM2 through the fourth NMOS transistor NM4, the fifth resistor R5, and the sixth resistor R6. Therefore, the comparison voltage Vcpr is expressed as the following equation.

$$Vcpr = HVout' - (R1 + R5 + R6) \times \text{current}$$

If the resistances gradually decrease from the first node N1 to the seventh node N7 like in the above-described example embodiments, the influence of the on-resistances of the transistors can be significantly reduced. The on-resistance represents a parasitic resistance formed when a current flows through a turned-on transistor.

Specifically, the gate-source voltages of the transistors NM1 through NM6 gradually increase from the first node N1 to the seventh node N7. This is because the node voltages gradually decrease toward the seventh node N7. Therefore, the gate-source voltage of the sixth NMOS transistor NM6 disposed between the sixth node N6 and the seventh node N7 may be highest. The voltage generator 100 is designed such that the sixth resistor R6 having the lowest resistance is less influenced by the on-resistance of the transistor, reducing or minimizing the parasitic resistance of the voltage generator 100.

On the other hand, the gate-source voltage of the first NMOS transistor NM1 disposed between the first node N1 and the second node N2 is lowest. However, since the resistance of the first resistor R1 connected to the first NMOS transistor NM1 is much greater than the on-resistance of the transistor, it has less influence on the generation of the parasitic resistance of the voltage generator 100.

Referring to FIGS. 4 and 5, the comparator COM compares the comparison voltage Vcpr with the reference voltage Vref to generate the control signal XCON. The comparator COM may be connected to the seventh node N7 of the string. The comparator COM may be a differential amplifier that receives the reference voltage Vref at a non-inverting terminal and the comparison voltage Vcpr at an inverting terminal and detects a difference between the two voltages.

When the voltage level of the temporary voltage Vout' reaches the target voltage Vout, the input voltages of the two terminals of the differential amplifier COM are equal to each other and thus the differential amplifier COM generates the control signal XCON having a first logic level, that is, logic low "L". That is, when the voltage level of the temporary voltage Vout' reaches the target voltage Vout, the comparison voltage Vcpr may be equal to the reference voltage Vref. In example embodiments of FIG. 5, the reference voltage Vref may be 1 V. Therefore, when the voltage level of the temporary voltage Vout' reaches the target voltage Vout, the comparison voltage Vcpr may also be 1 V.

Although not illustrated in FIG. 5, a seventh resistor (not shown) may be connected between the seventh node N7 and a ground node (not shown). When the comparison voltage Vcpr is 1 V, the seventh resistor may be 100 kΩ. In this case, a current of 10 µA obtained by dividing the difference between the comparison voltage Vcpr and the ground voltage (not shown) by a resistance of the seventh resistor may flow through the string.

On the other hand, when the voltage level of the temporary voltage Vout' does not reach the target voltage Vout, a current different from the current of 10µ flows through the string. Therefore, different voltage drops occur at the respective nodes N1 through N7 of the string. Thus, the voltage level of the comparison voltage Vcpr may not be 1 V.

In this case, the differential amplifier COM outputs the control signal XCON having a voltage level corresponding to the difference between the reference voltage Vref and the comparison voltage Vcpr, not the first logic level. Therefore, as described above, the voltage pump 120 continuously performs the voltage pumping operation.

FIGS. 6 through 9 are circuit diagrams of voltage generators according to various, example embodiments.

Figure 6:
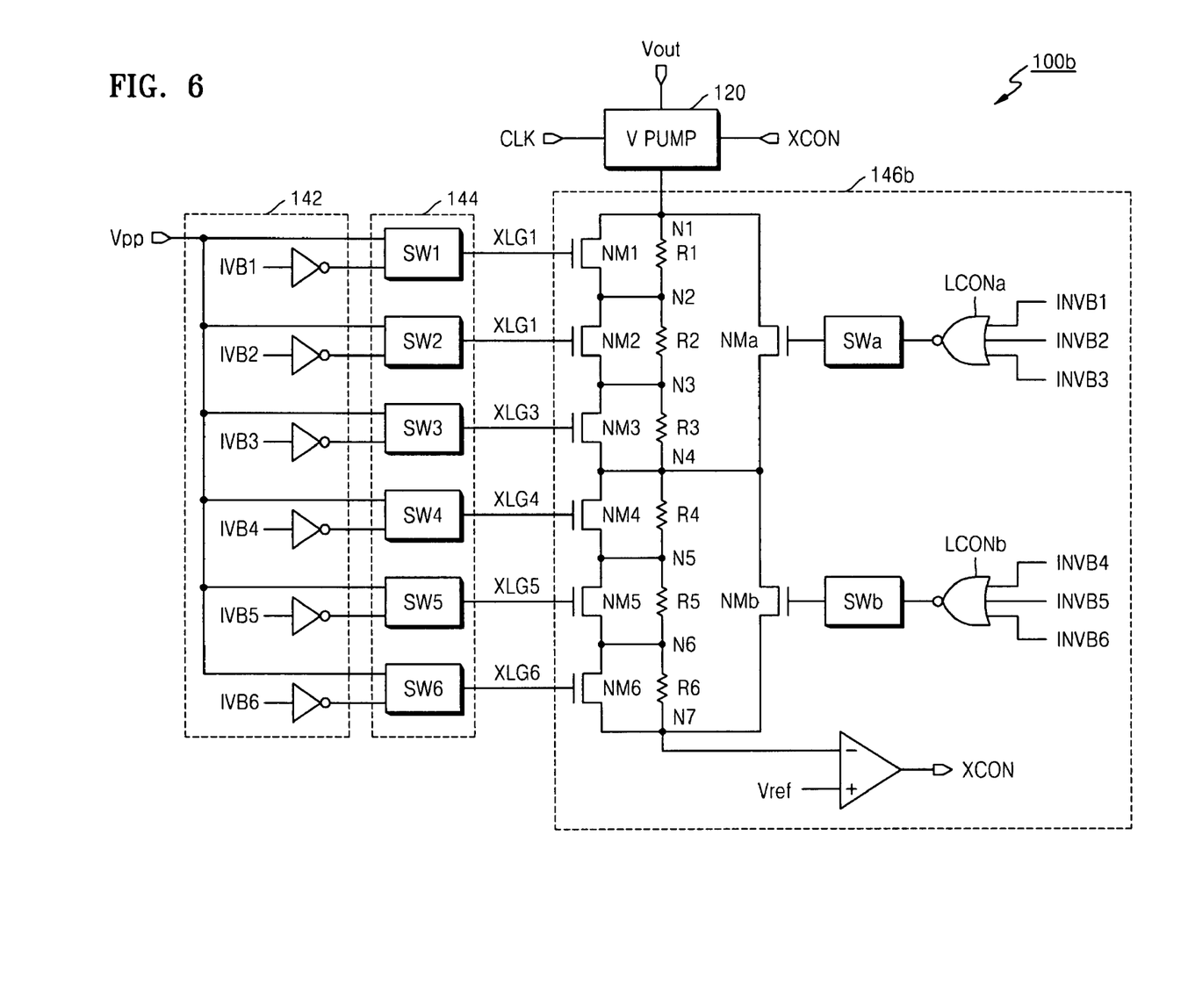
FIG. 6 is a circuit diagram of the voltage generator of FIG. 4 according to example embodiments.
Figure 7:
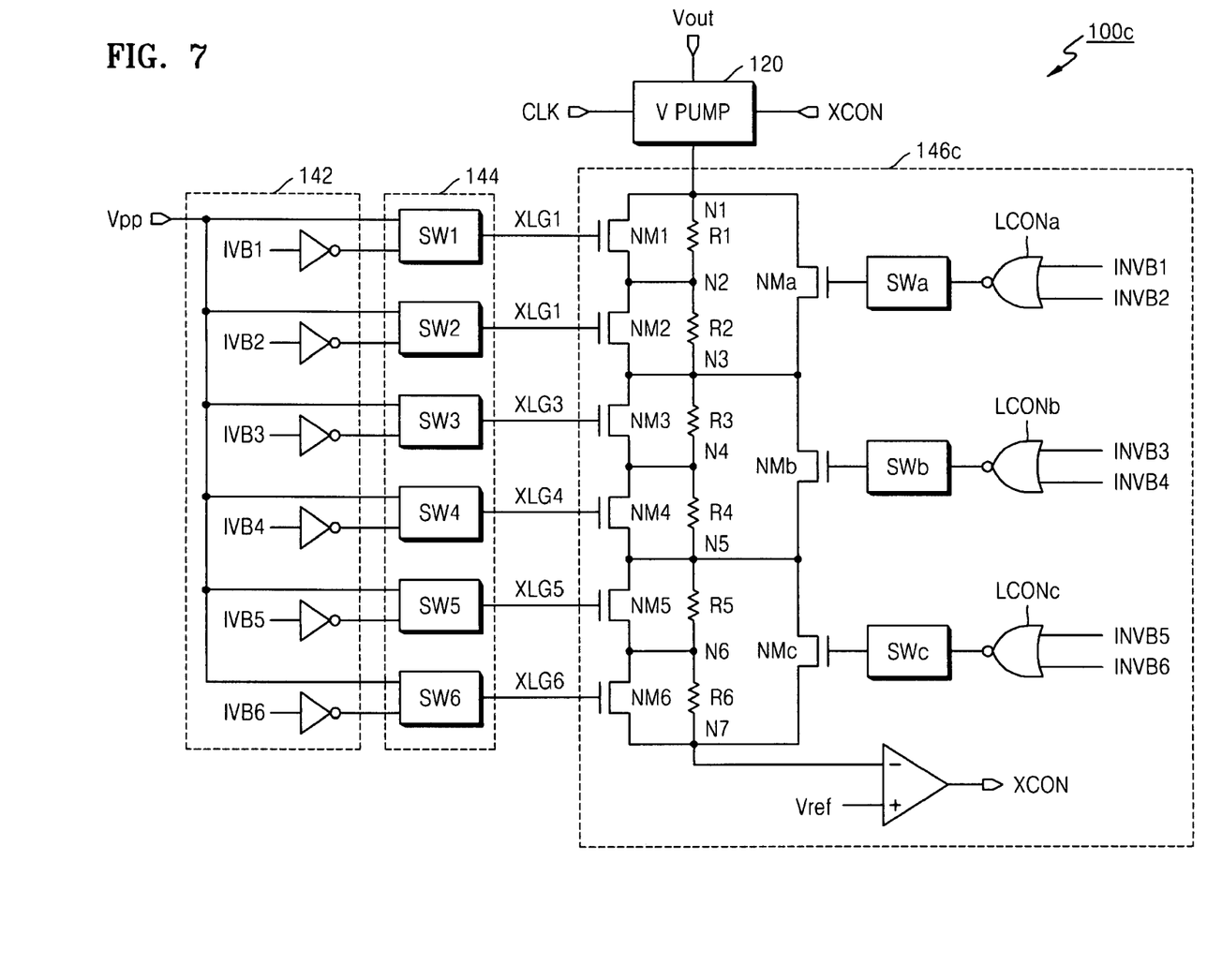
FIG. 7 is a circuit diagram of the voltage generator of FIG. 4 according to example embodiments.
Figure 8:
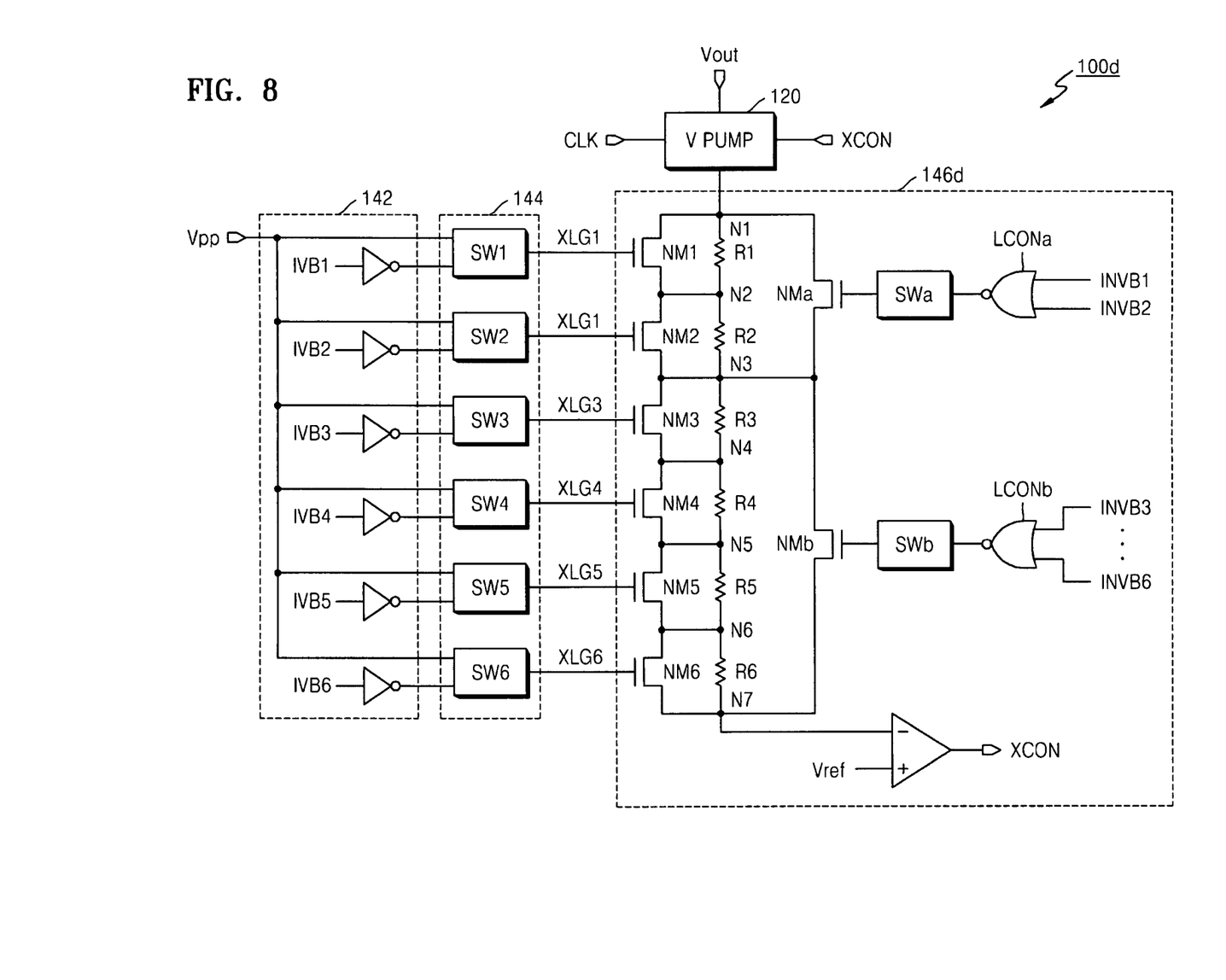
FIG. 8 is a circuit diagram of the voltage generator of FIG. 4 according to example embodiments.
Figure 9:
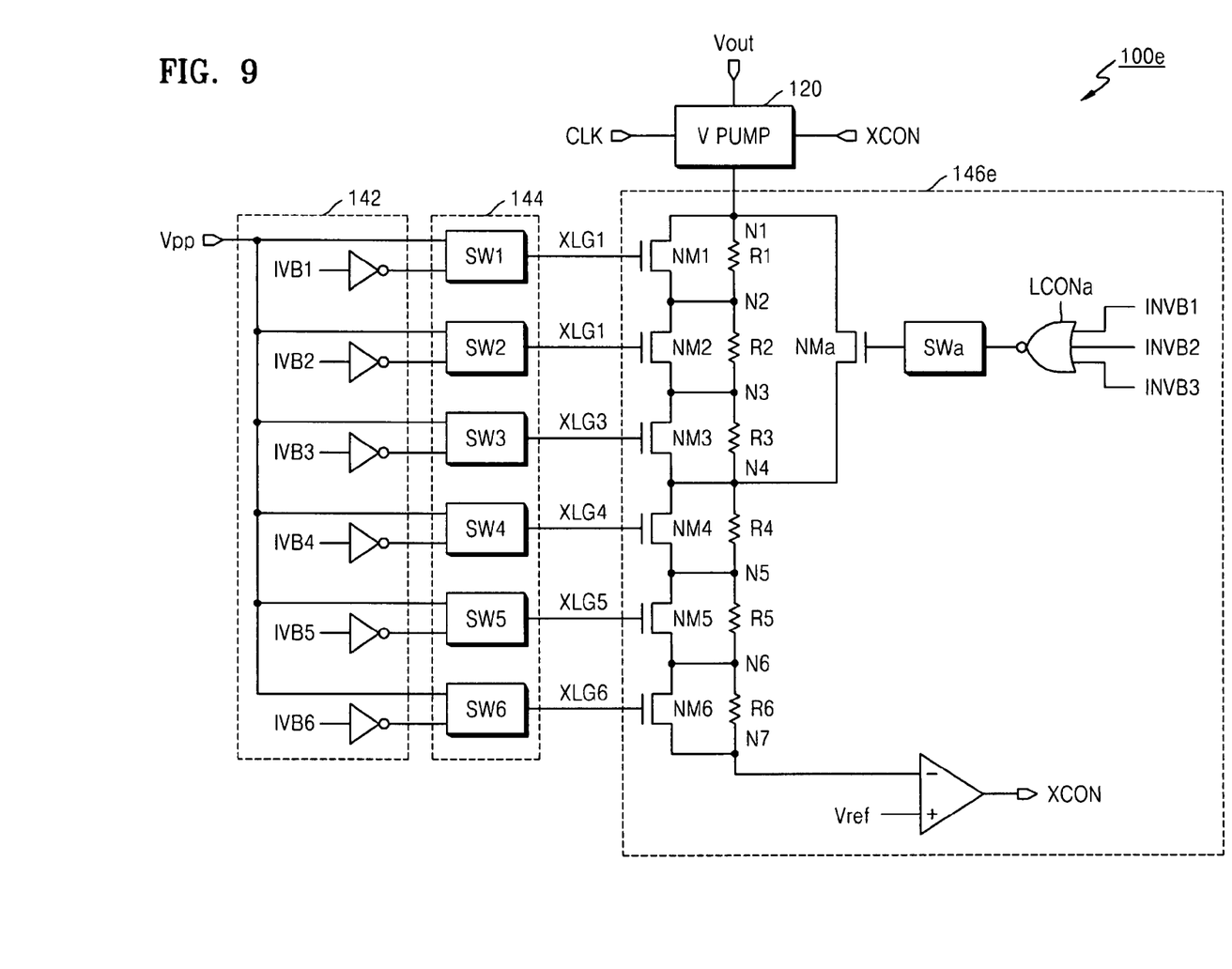
FIG. 9 is a circuit diagram of the voltage generator of FIG. 4 according to v.

Referring to FIGS. 4 and 6 through 9, the voltage controller 140 according to example embodiments may further include one ore more jumping units. Each jumping unit may control the connection or disconnection of two arbitrary nodes of the string. Example embodiments having two jumping units are illustrated in FIG. 6, and example embodiments having three jumping units are illustrated in FIG. 7. "Equal" jumping units refer to jumping units that connect the same number of resistors between two nodes. Example embodiments having two equal jumping units are illustrated in FIG. 6, and example embodiments having three equal jumping units are illustrated in FIG. 7. "Different" jumping units refer to jumping units that connect a different number of resistors between two nodes. Example embodiments having two different jumping units are illustrated in FIG. 8. Example embodiments having a single jumping unit are illustrated in FIG. 9.

A jumping unit disposed between the first node N1 and the fourth node N4 in FIG. 6 will now be described. The structure and operation of the remaining jumping units may be the same.

A jumping unit may include a connection transistor NMa, a switch SWa, and/or control logic LCONa. The connection transistor NMa connects two arbitrary nodes. For example, two jumping units of FIG. 6 are disposed between the first node N1 and the fourth node N4 and between the fourth node N4 and the seventh node N7, respectively. The connection transistor NMa may be an NMOS transistor.

The control logic LCONa generates a switching signal turning on or off the connection transistor NMa according to the respective bit values of the voltage information IVBi. The control logic LCONa may be a NOR gate receiving the corresponding bit values of the voltage information. The switch SWa turns on or off the connection transistor NMa in response to the switching signal.

For example, assuming that the first through third bits IVB1 through IVB3 of the voltage information are "0", the control logic LCONa generates the switching signal of logic high "H" and the connection transistor NMa is turned on in response to the switching signal of logic high "H". Therefore, a path from the first node N1 to the fourth node N4 is electrically shorted.

By making a current flow through a path formed by two or more transistors, it is possible to reduce or minimize parasitic resistance components of the voltage generator, which may be caused by current flowing through the transistor. Hence, voltage generators according to example embodiments may more accurately generate step voltages based on an ISPP scheme of an MLC flash memory.

Figure 10:
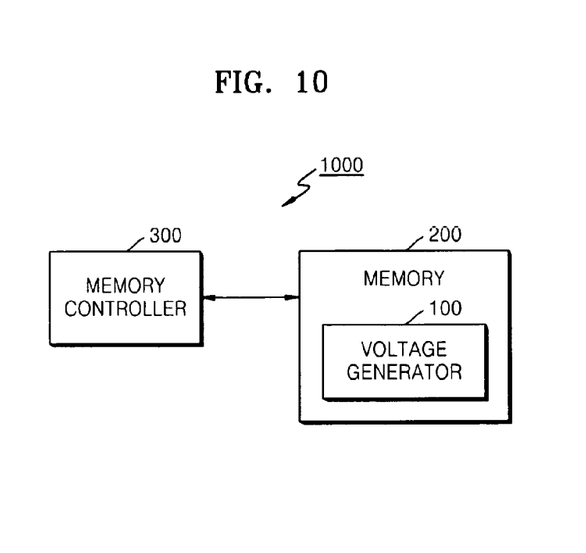
FIG. 10 is a block diagram of a memory including a voltage generator of FIG. 4 and a memory system including the memory.

FIG. 10 is a block diagram of a memory system having a memory having a voltage generator of FIG. 4.

Referring to FIGS. 4 and 10, the memory system 100 according to example embodiments may include a memory 200 having a voltage generator 100 of FIG. 4, and a memory controller 300 controlling the memory 200. Since the memory 200 and the memory system 1000 having the memory 200 use a voltage generator of FIG. 4 to generate the voltage, detailed description thereof will be omitted.

The jumping units of FIGS. 6 through 9 may be applied to a semiconductor memory device having a string with a structure different from the string of FIG. 4.

The voltage generator according to example embodiments may generate a more accurate voltage level.

While example embodiments have been particularly shown and described with reference to FIGS. 4-10, it will be understood by those of ordinary skill in the art that various changes in form and details may be made therein without departing from the spirit and scope of example embodiments as defined by the following claims.

What is claimed is:

1. A voltage generator of a nonvolatile memory, comprising:
   a voltage pump generating a target voltage using a clock signal; and
   a voltage controller comparing a temporary voltage input from the voltage pump with a reference voltage to generate a control signal controlling the voltage pump,
   wherein the voltage controller comprises:
   a string of a plurality of resistors connected in series to change a voltage level of the temporary voltage to a voltage level of a corresponding comparison voltage; and at least one jumping unit controlling connection or disconnection of two arbitrary nodes among first to n-th nodes (where n is a natural number) defined as connection points of adjacent resistors of the string.

2. The voltage generator of claim 1, wherein a resistance of the resistor of the plurality of resistors closest to one end of the string is greater than resistances of the other resistors of the plurality of resistors of the string.

3. The voltage generator of claim 1, wherein resistances of the plurality of resistors gradually decrease from the one end of the string connected to the voltage pump to the other end of the string connected to a comparator.

4. The voltage generator of claim 3, wherein a difference of resistance between the adjacent resistors is two times or ½ times.

5. The high voltage generator of claim 1, wherein when the reference voltage is equal to the comparison voltage, the voltage pump finishes a voltage pumping operation and outputs the temporary voltage as the target voltage.

* * * * *